US011573814B1

(12) United States Patent
Aithal et al.

(10) Patent No.: US 11,573,814 B1
(45) Date of Patent: Feb. 7, 2023

(54) SHARING PREPOPULATED CONTAINER IMAGE CACHES AMONG CONTAINER EXECUTION ENVIRONMENTS

(71) Applicant: Amazon Technologies, Inc., Seattle, WA (US)

(72) Inventors: Anirudh Balachandra Aithal, Seattle, WA (US); Noah Meyerhans, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 248 days.

(21) Appl. No.: 16/217,454

(22) Filed: Dec. 12, 2018

(51) Int. Cl.
G06F 9/455 (2018.01)
G06F 9/50 (2006.01)
H04L 41/5054 (2022.01)
G06F 16/11 (2019.01)
H04L 67/60 (2022.01)

(52) U.S. Cl.
CPC ........ G06F 9/45558 (2013.01); G06F 9/5077 (2013.01); G06F 16/113 (2019.01); G06F 16/128 (2019.01); H04L 41/5054 (2013.01); H04L 67/60 (2022.05); G06F 2009/45575 (2013.01); G06F 2009/45583 (2013.01)

(58) Field of Classification Search
CPC .................................................. G06F 9/45558
USPC ............................................................ 718/1
See application file for complete search history.

(56) References Cited

U.S. PATENT DOCUMENTS

| 8,655,848 | B1* | 2/2014 | Leverett | G06F 16/178 |
| | | | | 707/660 |
| 9,292,330 | B2* | 3/2016 | Bonilla | G06F 3/0619 |
| 9,633,406 | B2* | 4/2017 | Bala | G06T 1/0007 |
| 9,766,945 | B2* | 9/2017 | Gaurav | G06F 9/5016 |
| 9,898,320 | B2* | 2/2018 | Tarasuk-Levin | G06F 9/45558 |
| 10,002,247 | B2* | 6/2018 | Suarez | G06F 21/31 |
| 10,789,104 | B2* | 9/2020 | Ivanov | G06F 9/455 |
| 2012/0005673 | A1* | 1/2012 | Cervantes | G06F 9/45558 |
| | | | | 718/1 |
| 2016/0378518 | A1* | 12/2016 | Antony | G06F 9/4856 |
| | | | | 718/1 |
| 2017/0264684 | A1* | 9/2017 | Spillane | H04L 67/1095 |

(Continued)

Primary Examiner — Evral E Bodden
(74) Attorney, Agent, or Firm — Nicholson De Vos Webster & Elliott LLP

(57) ABSTRACT

Techniques are described for sharing prepopulated container image caches among container execution environments to improve the performance of container launches. The container images used to prepopulate such a cache at a computing device supporting one or more container execution environments can include various container images that are used as the basis for a wide range of user-created containers such as, for example, container images representing popular operating system distributions, database servers, web-application frameworks, and so forth. Existing systems typically obtain these container images as needed at runtime when launching containers (for example, from a container registry or other external source), often incurring significant overhead in the container launch process. The use of a prepopulated container image cache can significantly improve the performance of container launches by making such commonly used container images available to container execution environments running at a computing device ahead of time.

17 Claims, 9 Drawing Sheets

(56) References Cited

U.S. PATENT DOCUMENTS

| | | | |
|---|---|---|---|
| 2019/0065096 A1* | 2/2019 | Sterin | G06F 16/1824 |
| 2019/0303623 A1* | 10/2019 | Reddy | H04L 9/3239 |
| 2019/0347121 A1* | 11/2019 | Luo | G06F 9/542 |
| 2022/0083248 A1* | 3/2022 | Shah | G06F 3/0664 |

* cited by examiner

SHARING PREPOPULATED CONTAINER IMAGE CACHES AMONG CONTAINER EXECUTION ENVIRONMENTS

BACKGROUND

Many companies and other organizations operate computer networks that interconnect numerous computing systems to support their operations. For example, data centers housing significant numbers of interconnected computing systems have become commonplace. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources. Virtualization technologies, for example, may allow a single physical computing machine to be shared among multiple users by providing each user with one or more virtual machines hosted by the single physical computing machine. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

A recently popular virtualization technology is application containerization. At a high level, containers are a method of operating system virtualization that allow users to run software applications and their dependencies in resource-isolated processes and in a consistent manner across different deployment environments. To enable container-based applications to run consistently across various deployment environments, a container is constructed as an atomic, self-contained package of software that includes everything needed to run the software contained therein (that is, a container includes any necessary code, runtime, libraries, packages, and so forth). The use of containers has become a popular application development and deployment tool in part because containers generally are portable, lightweight, standardized, and easy to deploy in a consistent manner regardless of deployment environment.

BRIEF DESCRIPTION OF DRAWINGS

Various embodiments in accordance with the present disclosure will be described with reference to the drawings, in which.

DETAILED DESCRIPTION

Figure 1:
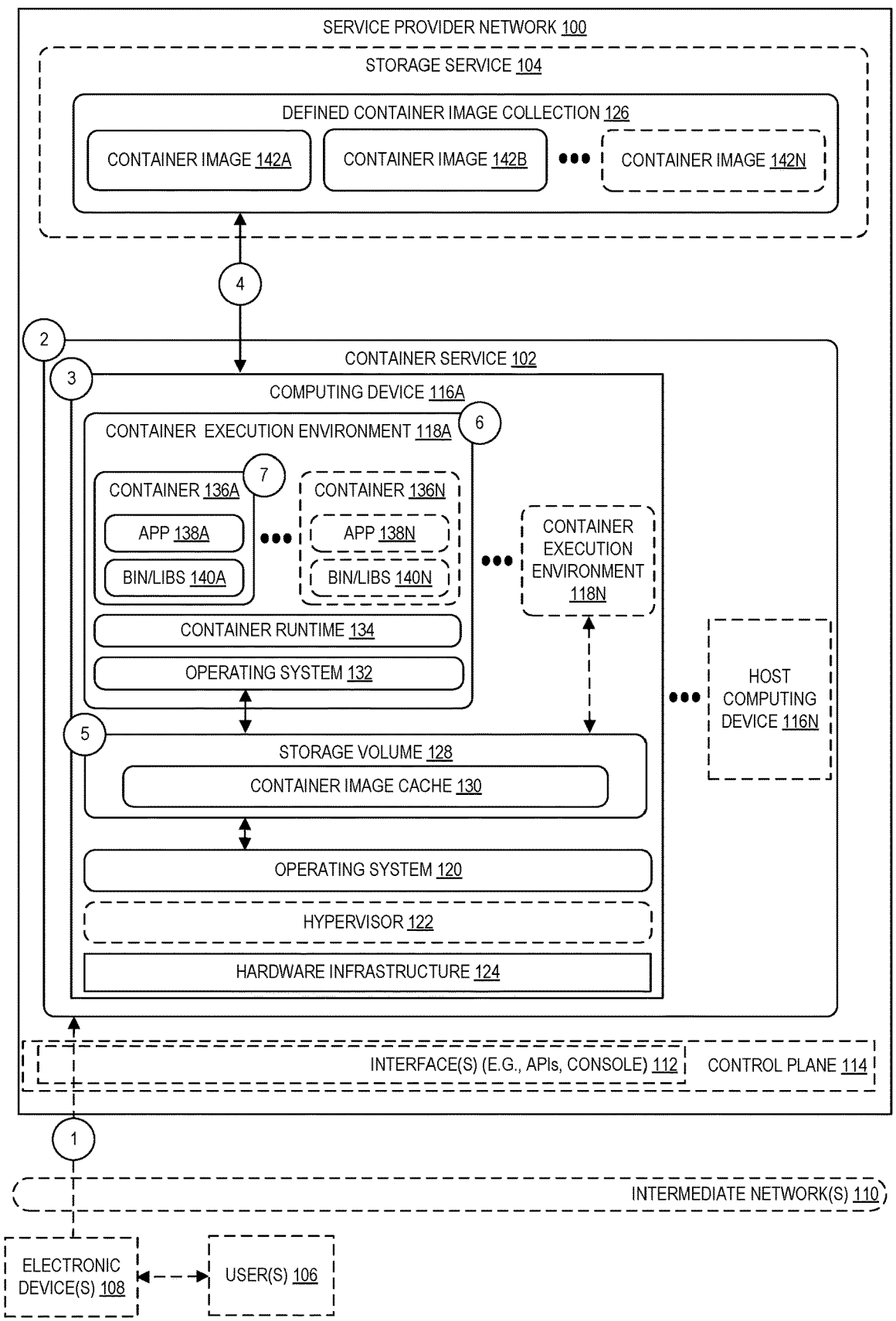
FIG. 1 is a diagram illustrating an environment for sharing prepopulated container image caches among container execution environments according to some embodiments.

Various embodiments of methods, apparatus, systems, and non-transitory computer-readable storage media are described for sharing prepopulated container image caches among container execution environments to improve the performance of container launches. The container images used to prepopulate such a cache at a computing device supporting one or more container execution environments can include various container images that are used as the basis for a wide range of user-created containers such as, for example, container images representing popular operating system distributions, database servers, web-application frameworks, and so forth. Existing systems typically obtain these container images as needed at runtime when launching containers (for example, from a container registry or other external source), often incurring significant overhead in the container launch process. According to embodiments herein, the use of a prepopulated container image cache can significantly improve the performance of container launches by making these commonly used container images available to container execution environments running at a computing device ahead of time.

The use of containers to develop and deploy software applications continues to increase in popularity. At a high level, containers are a method of operating system virtualization that allow users to run an application and its dependencies in resource-isolated processes and in a consistent manner across different deployment environments. To enable container-based applications to run consistently across various deployment environments, containers are constructed as atomic, self-contained packages of software that includes everything needed to run the software contained therein (that is, a container includes any necessary code, runtime, libraries, packages, and so forth). The use of containers has become a popular application development and deployment tool at least in part because containers are generally portable, lightweight, standardized, and easy to deploy in a consistent manner regardless of deployment environment.

A container image representing a containerized software application is often comprised of one or more "base" image layers which can be optionally "overlaid" with one or more user-created layers. The base image layers, for example, typically include various types of commonly used software applications such as operating systems, database servers, web-application frameworks, and so forth, upon which various types of user applications can be created. An example container image, for example, might include one base image layer including a popular operating system distribution, another base image layer including a popular open source database server, and a user may overlay those images with a custom container image including user-created software that depends on the software contained in the underlying layers.

A container image can be executed by a container runtime, which can be installed at a host operating system. Depending on the format of the container image, any of a number of available container runtimes can be used including, for example, container runtimes provided by the Docker® or other container platforms. A container image is generally treated as read-only data by a container runtime. To enable changes to be made to a containerized software application during execution, execution of a container includes adding an additional writable layer on top of the other layers contained in the container image (that is, the base image layers and any additional user-created layers). When a container is launched, the container runtime determines whether each of the layers of the container image is present in local storage and, if not, the layers can be obtained at runtime from a remote storage location. In some cases, the remote storage location can be either a public or private "container registry" that stores containers images used by various containers. In part because these container image layers are treated as read-only data, once a container image layer is obtained and stored locally by the container runtime, that same image layer can be used for subsequent executions of the same container as well as for executions of other containers that are based on one or more of the same base image layers. The creation of this local cache of container images can significantly improve the startup time for subsequently launched containers within the same container execution environment.

Although the use of a dynamically populated container image cache as described above can improve the startup time for subsequent container launches, there is still often significant overhead incurred by container runtimes each time a non-cached container image is retrieved and stored at runtime. For example, the base image layers corresponding to commonly used operating system software, database server software, and the like, are often much larger in size than additional user-created layers and time involved to obtain and locally store these common base image layers can thus have a significant impact on container launch times. Furthermore, in some service provider environments, container execution environments are created and deleted often and thus the usefulness of such dynamically created caches is further reduced.

According to embodiments described herein, to improve the efficiency of container launches, computing devices hosting container runtime environments instead create a prepopulated container image cache at the time the computing device is launched. The presence of commonly used container layers at a computing device before any containers are launched can significantly improve the container launch time for any containers based on one or more of the precached container layers. This latency improvement is further shared among every user that launches a container at the computing device that is based on one or more of the cached layers.

FIG. 1 is a block diagram illustrating an environment for sharing prepopulated container image caches among container execution environments. In some embodiments, a container service 102 and a storage service 104, among any number of other possible services, operate as part of a service provider network 100 and each comprises one or more software modules executed by one or more electronic devices at one or more data centers and geographic locations. A user 106 using one or more electronic device(s) 108 (which may be part of or separate from the service provider network 100) can interact with the various services of the service provider network 100 via one or more networks, such as the internet.

A provider network 100 provides users with the ability to utilize one or more of a variety of types of computing-related resources such as compute resources (for example, executing virtual machine (VM) instances and/or containers, executing batch jobs, executing code without provisioning servers), data/storage resources (for example, object storage, block-level storage, data archival storage, databases and database tables, etc.), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 110 (for example, the internet) via one or more interface(s) 112, such as through use of application programming interface (API) calls, via a console implemented as a website or application, etc. The interface(s) 112 may be part of, or serve as a front-end to, a control plane 114 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As indicated above, some users of a service provider network 100 desire the ability to run containerized software applications using computing resources provided by the service provider network. A service provider network 100, for example, may include a container service 102 that provides scalable container management enabling users to run containerized software applications on managed clusters of compute instances. Using API calls or other interfaces, for example, users can use a container service 102 to launch containerized applications and to manage container placement, among other possible configurations. In other embodiments, a container service 102 can enable users to run containers without the user needing to explicitly provision, configure, or scale compute instance clusters upon which the containers are to execute.

A containerized software application typically is built upon one or more "base" container image layers which are optionally overlaid with one or more user-created layers. For example, the base layers may represent common software components including, for example, operating systems, database servers, web-application frameworks, and so forth, upon which other user-created software is built. For example, a base image layer may be a default installation of a popular operating system distribution and a user can overlay their application and configurations on top of it because their application expects to run in the runtime environment of the particular operating system. A user can build an image based on the base image layer, a layer containing the user-created software component, and further overlay some configuration and other information necessary to integrate it with the runtime environment, as necessary. These layers of a container image can be stored in a way such that the image contents are transparently overlaid, forming a single file system that can be used by a container runtime, as described in more detail below.

A notable difference between a container image, as described above, and the execution of a container by a container runtime is the creation of an additional writable layer. During execution of a container by a container runtime, operations that add new or modify existing data of a container image are stored in this writable layer and the underlying read-only image layers remain unchanged. In part because these underlying image layers are maintained as read-only data, these layers can be cached and reused by separate container executions that are based on the same layers. Some of these base layers may be used by many containers, as described above. Thus, when a user requests to run a user-created container, if any of the base layers upon which the user-created container is built are already present in a filesystem cache, then only any additional user-added layers possibly needs to be retrieved to start execution of the container. These user-added layers are often significantly smaller than the base layers containing entire operating systems, database servers, and so forth, and thus typically have minimal impact on the time required to launch the containers.

Figure 2:
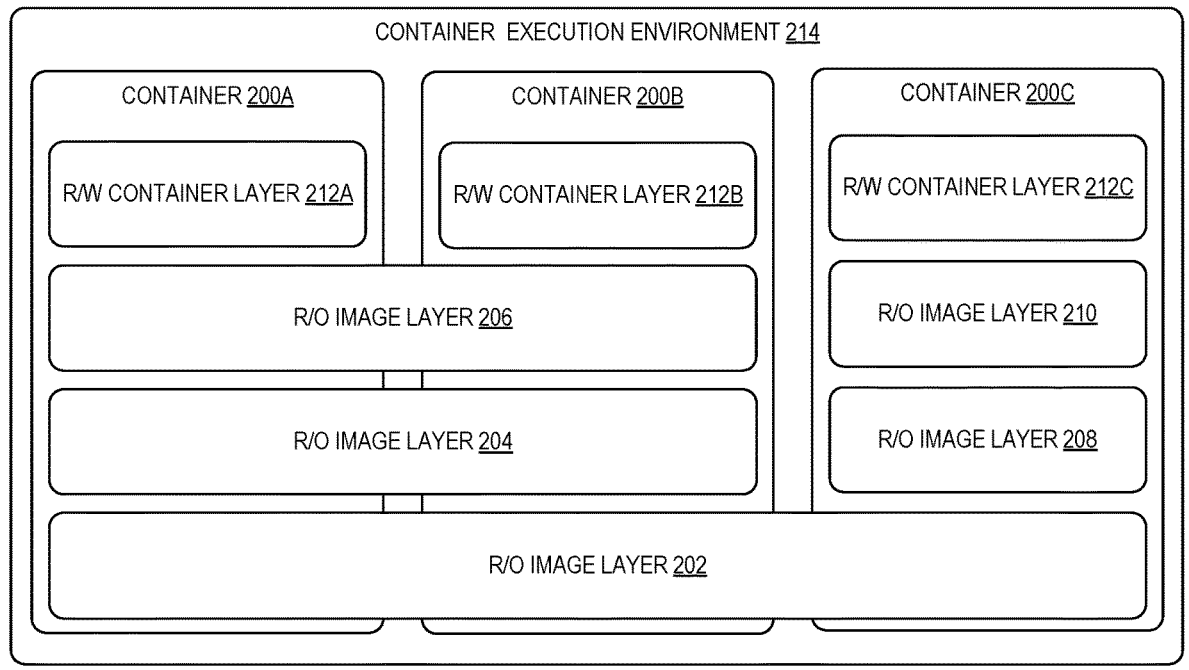
FIG. 2 is a diagram illustrating multiple containers sharing read-only container image layers according to some embodiments.

FIG. 2 is a diagram illustrating multiple containers sharing one or more read-only container image layers according to some embodiments. As shown in FIG. 2, a container execution environment 214 is currently executing three separate containers 200A-200C. The container 200A, for example, is based on several read-only container image layers, including read-only container image layers 202, 204, and 206. The execution of the container 200A further includes the creation of an additional read-write layer 212A representing the writable storage layer at which changes to the container can be stored. Because each container has its own writable container layer, and all changes are stored in this additional layer, multiple containers can share access to the same underlying images and still have their own data state.

FIG. 2 further illustrates that read-only container layers can be shared between two or more separately executing containers. The read-only image layer 202, for example, may include operating system software that is used by each of the containers 200A-200C. In this example, only a single copy of the read-only image layer 202 is used to support execution of each of the containers 200A-200C, which can significantly decrease the storage and other resource demands used to support execution of the containers. As illustrated by read-only image layers 204 and 206, some image layers can be shared by some but not all the containers executing within a container execution environment 214. As further illustrated by read-only image layers 208 and 210, some image layers may be specific to individual containers and not shared.

In some embodiments, a container execution environment 214 uses a storage driver to manage the contents of the read-only image layers (for example, read-only layers 202-210) and the read-write container layers (for example, read-write container layers 212A-212C). These storage drivers typically use "stackable" image layers and a copy-on-write (CoW) strategy to do so. Upon execution of a container, the CoW strategy involves creating the read-write container layer on top of the other read-only layers such that changes made to the filesystem storing the container are stored in the read-write layer. Files that are not changed do not get copied to this writable layer so that the writable layer is as small as possible.

When an existing file in a container is modified, a container runtime performs a CoW operation. At a high level, this process involves a storage driver searching the image layers for the file to be modified starting at the top read-write layer down to each base layer. The storage driver can then create a copy at the container's writable layer of the first copy of the file that is found. Modifications can then be made to this copy of the file and the container cannot see the read-only copy of the file that exists in the lower layer. In addition to saving on storage space, this strategy can also reduce container launch time. In particular, assuming the base container layers are present at the container execution environment, the launch of a container (or of multiple containers from the same image) involves only the creation of the top writable container layer.

Figure 3:
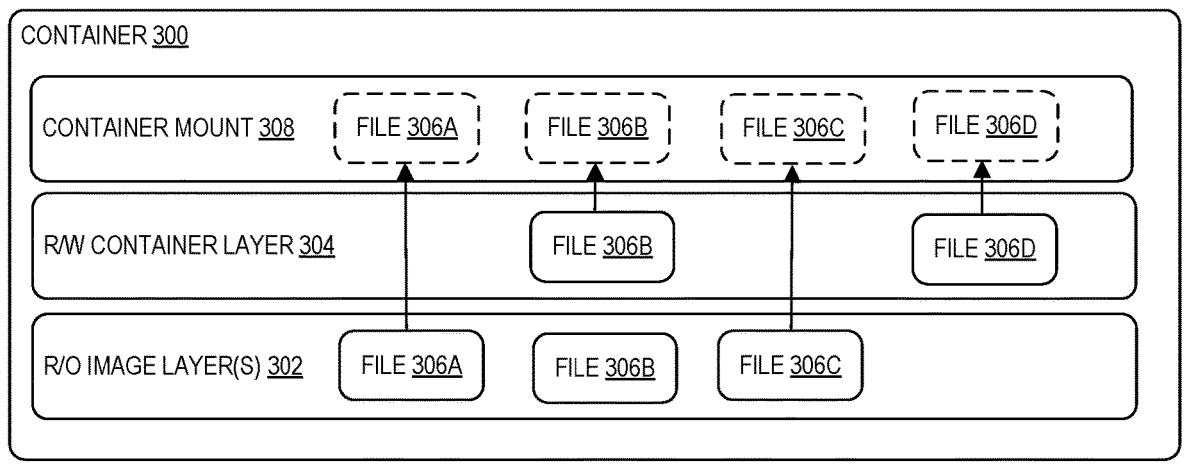
FIG. 3 is a diagram illustrating an example of a union filesystem used by container execution environments according to some embodiments.

FIG. 3 is a diagram illustrating an example of a union filesystem used by container execution environments according to some embodiments. A union filesystem, for example, can be used to help manage the layering of container images of a container 300, as described herein. As shown, a union filesystem generally enables a read-write file directory (for example, the read-write container layer 304) to be overlaid onto one or more underlying read-only file directories (for example, the read-only image layer(s) 302) where the result is presented as a single directory, for example, to a container runtime (for example, as the container mount 308). In FIG. 3, for example, the copy of each of the files 306A-306D presented in the container mount 308 is derived from either the read-write container layer 304 or the read-only image layer(s) 302 depending on whether a modification to the file has been made in the read-write container layer 304.

When launching container execution environments within a container service 102, there is a desire to provide a prepopulated cache of popular container images at the hosts supporting those container execution environments. Without the prepopulated container image cache described herein, the first time that a container is launched in a container execution environment, the base layers and any additional user-created layers of the container need to be fetched from a container registry or other storage location. Subsequent launches of containers derived from the same base layers can make use of cached copies of the layers; however, this cache is available only for the lifetime of the container execution environment where this container is running, which is often relatively short. Embodiments described herein prepopulate a cache with some popular container image ahead of time to avoid the overhead of obtaining and storing the container layers at runtime.

In an embodiment, at the circle labeled "1" in FIG. 1, a container service 102 of a service provider network 100 receives a request to run a containerized software application. In one embodiment, the request identifies at least one container image, where the container image may be based on one or more container image layers. As indicated above, these container image layers may include publicly available and commonly used software components and may also one or more layers containing user-created software and/or configurations, or any other container components. In some embodiments, the identified container images may have been created based on a build file that specifies a series of commands used to assemble the user-created container image based on the one or more constituent container image layers. In some embodiments, the request can further include additional configuration information such as resource allocations for particular containers, load balancing options, identity and access management roles, compute cluster configurations including a number of available container execution environments to be made available, and so forth.

In the example shown in FIG. 1, the request to run a containerized software application is received from an electronic device 108, for example, as an API request or via any other type of interface. In other examples, a request can be received from the container service 102, from another service of the service provider network 100, or from another application or service external to the service provider network. For example, the request may be received in response to the container service 102 generating a request to launch additional containers in response to an auto scaling threshold being met or based on any other condition.

In an embodiment, at the circle labeled "2," the container service 102 processes the request to run the containerized software application. The container service 102, for example, may determine whether the request can be satisfied by causing the identified container(s) to be launched within an existing container execution environment of an existing computing device, or whether a new container execution environment is to be created to launch the identified container(s). In the example shown in FIG. 1, the request involves the container service 102 provisioning a new computing device 116A (of any number of computing devices 116A-116N) at which to run the container(s) identified in the request.

In an embodiment, at the circle labeled "3," a computing device 116A is provisioned to support one or more container execution environments (for example, container execution environments 118A-118N). In one embodiment, the provisioning of a new computing device 116A includes initially launching an operating system 120 to be used to support the one or more container execution environments 118A-118N and other operations of the computing device 116A. As shown in FIG. 1, the operating system 120 can be a guest operating system of a hypervisor 122 running on and abstracting the hardware infrastructure 124 of the computing device 116A; in other examples, the operating system 120 can be a standalone operating system running in a non-virtualized environment.

In an embodiment, at the circle labeled "4," the computing device 116A obtains a defined collection of container images (for example, the defined container image collection 126 including container images 142A-142N) from an external storage location. In an embodiment, the defined collection of container images generally represents a set of container images that are believed to be likely used as base image layers by one or more containers requested for execution at the computing device.

In an embodiment, the storage location of the defined container image collection 126 generally can be any storage location accessible to computing devices provisioned by the container service 102. In one embodiment, the storage location can be provided by a storage service 104 of the service provider network 100. In other examples, the storage location can be provided by a component of the container service 102, by another service of the service provider network 100, or by a component that is external to the service provider network 100.

In one embodiment, the operating system 120, or a user space component executing at the operating system 120, is configured with functionality that causes the computing device 116A to obtain the defined container image collection 126 from the external storage location when the operating system 120 is launched. The functionality may be configured, for example, as a script or executable code that is included as part of an image used to launch the operating system 120 at the computing device 116A and at possibly any number of other computing devices.

In some embodiments, the defined container image collection 126 is stored as a filesystem containing each of the base container image layers. The filesystem storing the base container image layers can be created either on-demand (for example, by each computing device that obtains a copy of the container image cache), or the filesystem can be created beforehand and stored at the external storage location. In the second example, when a computing device launches, it can obtain the container image cache, which is already in a filesystem format, and create a copy of the filesystem at a local storage device, as described below.

In some embodiments, users can provide custom defined container image collections for use at computing devices associated with the users. For example, if a first user and a second user of the service provider network have different base image layers that they'd like to use, these users can each provide a separate defined container image collection 126. Each of these users can then instruct the container service 102 to use the user's specific defined container image collection at container execution environments launched on behalf of the user. In some examples, a user-provided cache can include proprietary container images that have been developed by the user and are not available to other users.

In some embodiments, access to container images in the defined container image collections can be based on access controls to ensure that users' container execution environments access only those containers to which particular users have access. As indicated above, users can provide user-selected container image caches or supplement existing an existing cache with one or more user-selected container images. The addition of such user-selected container images can be associated with access controls that define whether other users can access the selected container images.

In an embodiment, at the circle labeled "5," a component of or application running on the operating system 120 creates a storage volume 128 at an accessible block storage device, attaches the storage volume 128 to the operating system 120, and stores the obtained collection of container images as a container image cache 130 at the storage volume. In an embodiment, the storage volume 128 can be stored at a locally-attached block storage device, as depicted in FIG. 1, or stored at a remote and network-accessible block storage device (for example, as a storage volume stored by a separate storage virtualization service of the service provider network 100).

In an embodiment, similar to the functionality for obtaining the defined container image collection 126 from the external storage location, the functionality to create the storage volume 128 storing the container image cache 130 can be included as part of the image for the operating system 132, for example, as part of a user space component that is executed when the operating system 132 is launched. In one embodiment, the container images included in the container image cache 130 each have their own root file system which is packaged in a certain manner and is stored in a common file system, as described above.

As indicated above, the computing device includes an operating system 120 that includes functionality to attach the storage volume 128 storing the container image cache 130 to the operating system, where the storage volume 128 can be physically stored at a locally attached block device or at a remote, network-accessible storage device. In an embodiment, when new container execution environments are launched at the computing device 116A, this same storage volume 128 can be attached to the operating systems in the container execution environments as a read-only volume—that is, the operating systems can see but cannot modify the content. These operating systems can then create an additional read-write volume layer so that the same cache can be shared among any number of container execution environments. However, in part because the storage volume containing the container image cache is attached as a read-only (and thus no copying of the cached container images is needed), each new container execution environment has a very fast startup. By performing these processes before containers are launched, the processes of obtaining and caching these container image layers can be removed from the critical path for container launches.

In an embodiment, at the circle labeled "6," the computing device launches a container execution environment 118A. As shown in FIG. 1, a container execution environment can include a separate guest operating system 132 and a container runtime 134.

In one embodiment, launching the operating system 132 of the container execution environment 118A includes attaching the storage volume 128 storing the container image cache 130 as a read-only volume, and further creating an additional read-write volume to be used when running containers. In one embodiment, the process of attaching the storage volume 128 storing the container image cache 130 and creating the additional read-write volume is part of a user space startup service included in an image used to launch the operating system 132. In an embodiment, the startup service is pre-configured with, or is otherwise made aware of, the location of container image cache 130 and presents the container image cache 130 and additionally created read-write layer as the storage component for the container runtime 134.

In an embodiment, at the circle labeled "7," the container execution environment 118A starts execution of the container(s) identified in the request received at circle "1" (for example, the container 136A including application code 138A and any dependent binaries and libraries 140A). As described above, if a container to be executed is derived from any base container layers that are present in the previously attached and prepopulated container image cache 130, then execution of the container can be started using those present container layers without the need to retrieve the layers from an external container registry or other storage location. In an embodiment, any additional user-created layers that are not already present in the container image cache 130 can be retrieved from an external storage location and stored in the read-write storage layer, and optionally cached for future container executions.

Figure 4:
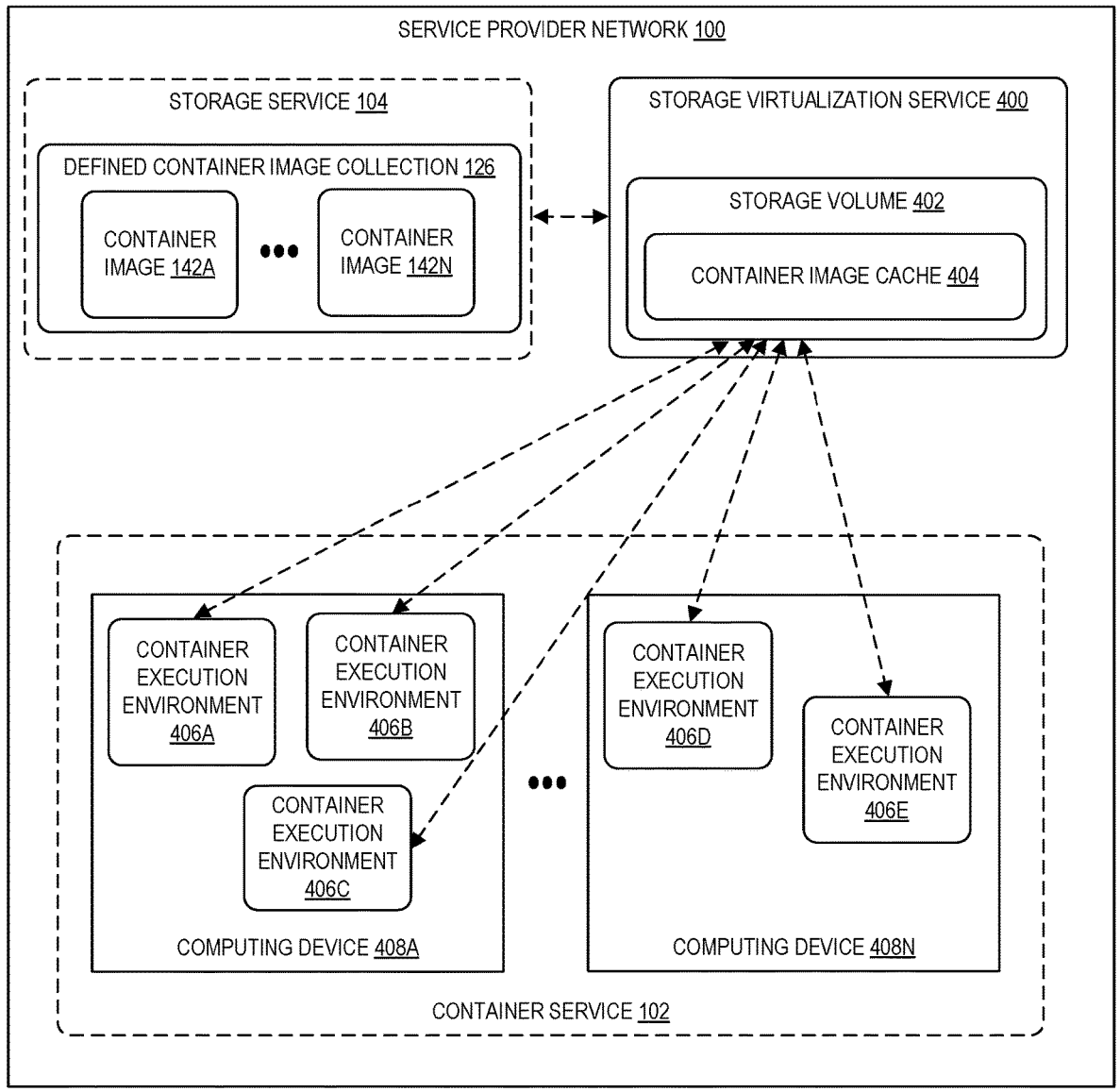
FIG. 4 is a diagram illustrating multiple container execution environments sharing a same network-accessible storage volume storing a prepopulated container image cache according to some embodiments.

In the example shown in FIG. 1, a container image cache can be shared among any number of container execution environments running on a computing device of a container service 102. In other embodiments, a container image cache 130 can instead by stored at a remote, network-accessible storage volume provided by a separate storage virtualization service and shared among any number of container execution environments hosted on any number of separate computing devices. FIG. 4 is a diagram illustrating multiple container execution environments sharing a same network-accessible storage volume storing a prepopulated container image cache according to some embodiments. As shown in FIG. 4, in one embodiment, a read-only storage volume 402 containing a container image cache 404 is created at a storage virtualization service 400. This read-only storage volume 402 can be attached to any number of container execution environments (for example, container execution environments 406A-406E) at any number of separate computing devices 408A-408N. Similar to FIG. 1, each separate container execution environment 406A-406E can create an independent writable layer on top of the read-only container image cache 404 at which changes can be stored during container execution. In other examples, the storage virtualization service 400 is a managed service that enables the provisioning and scaling of file systems that are accessible to container execution environments 406A-406E via a file system interface (for example, using operating system file I/O APIs) and that supports full file system access semantics such as strong consistency and file locking. In this example, a container image cache 404 can be stored in such a file system and shared with any number of container execution environments.

As indicated above, the container images included in the defined container image collection 126 generally represent container images that the service provider network 100 expects users of the container service 102 to use most often, for example, because the container images represent popular software packages that are used across many different types of containerized software applications. In one embodiment, to enable a more data-driven process for selecting the container images to include in a defined container image collection 126, computing devices provided by the container service 102 can be configured to monitor and report information indicating which container images are being used for container launches.

Figure 5:
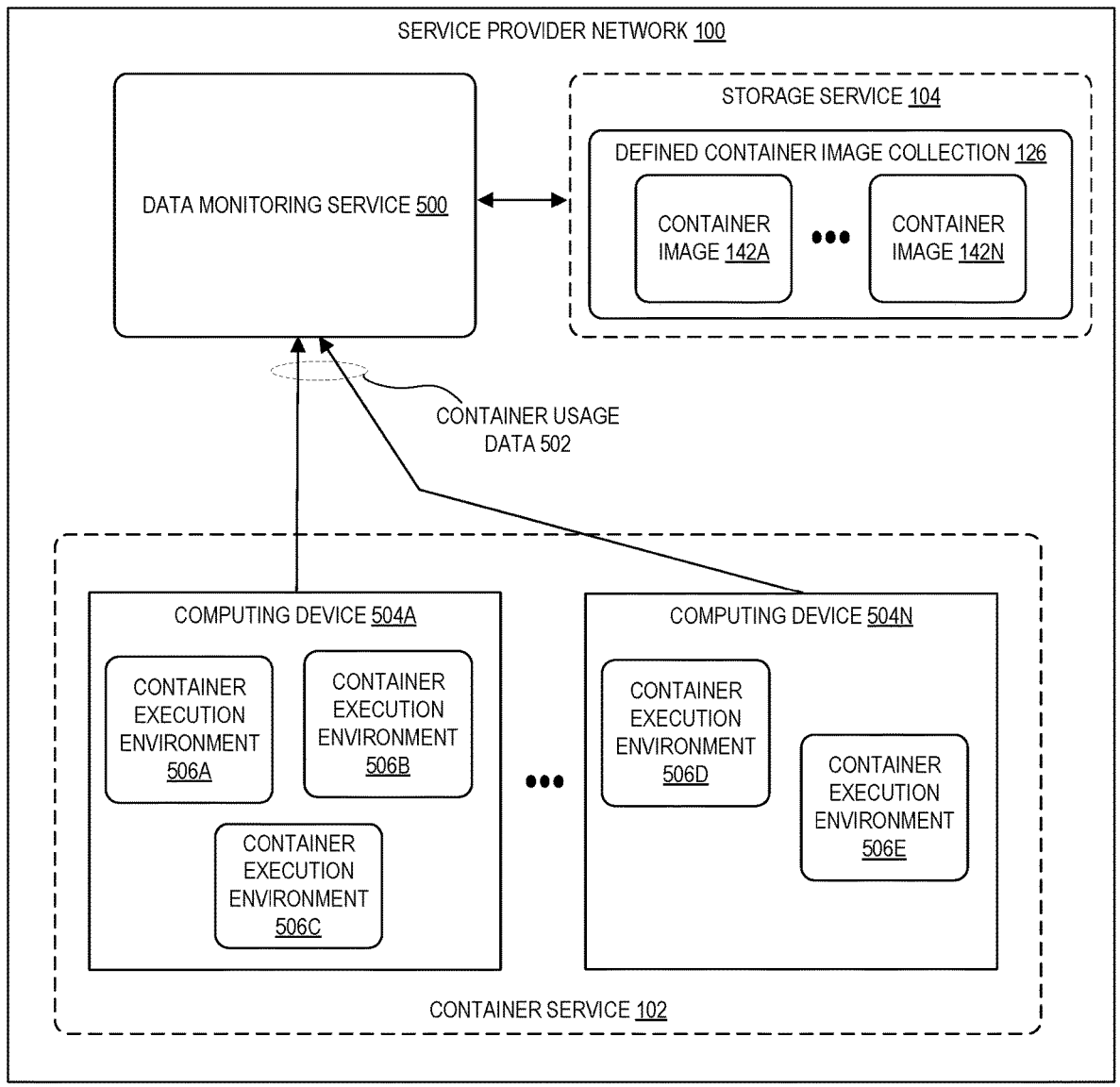
FIG. 5 is a diagram illustrating container execution environments reporting container image usage statistics for use in creating defined container image collections according to some embodiments.

FIG. 5 is a diagram illustrating container execution environments reporting container image usage statistics for use in creating defined container image collections according to some embodiments. For example, a monitoring application running on the computing devices 504A-504N can be configured to monitor each time a new container is launched in the container execution environments 506A-506E and to record identifiers of container image layers used to start each new container. This information can be sent to a centralized data monitoring service 500 or other storage location where the information can be analyzed to determine which container layers are used with the greatest frequency. In some embodiments, users can choose whether the user desires its container execution environments to report such container usage information.

As described above, when a user-created container layer that is not part of a defined container image collection is retrieved from an external storage location, that user-created container layer is stored on the local filesystem and is typically only available for reuse for subsequent container launches at that particular container execution environment. The lifespan of any particular container execution environment typically is relatively short and, thus, the value of dynamically updating the cache with these user-created container layers is decreased. In some embodiments, a container service 102 can generate user-specific container image caches that can be dynamically updated and shared with future container execution environments that are expected to run containers based on the user-specific container images. For example, the dynamically-created cache at computing devices (including both the prepopulated base layers and dynamically retrieved user layers) can be stored at an external storage location when a container execution environment terminates. In an embodiment, this offloaded user-specific cache can then be prepopulated at computing devices hosting other container execution environments for the same user.

Figure 6:
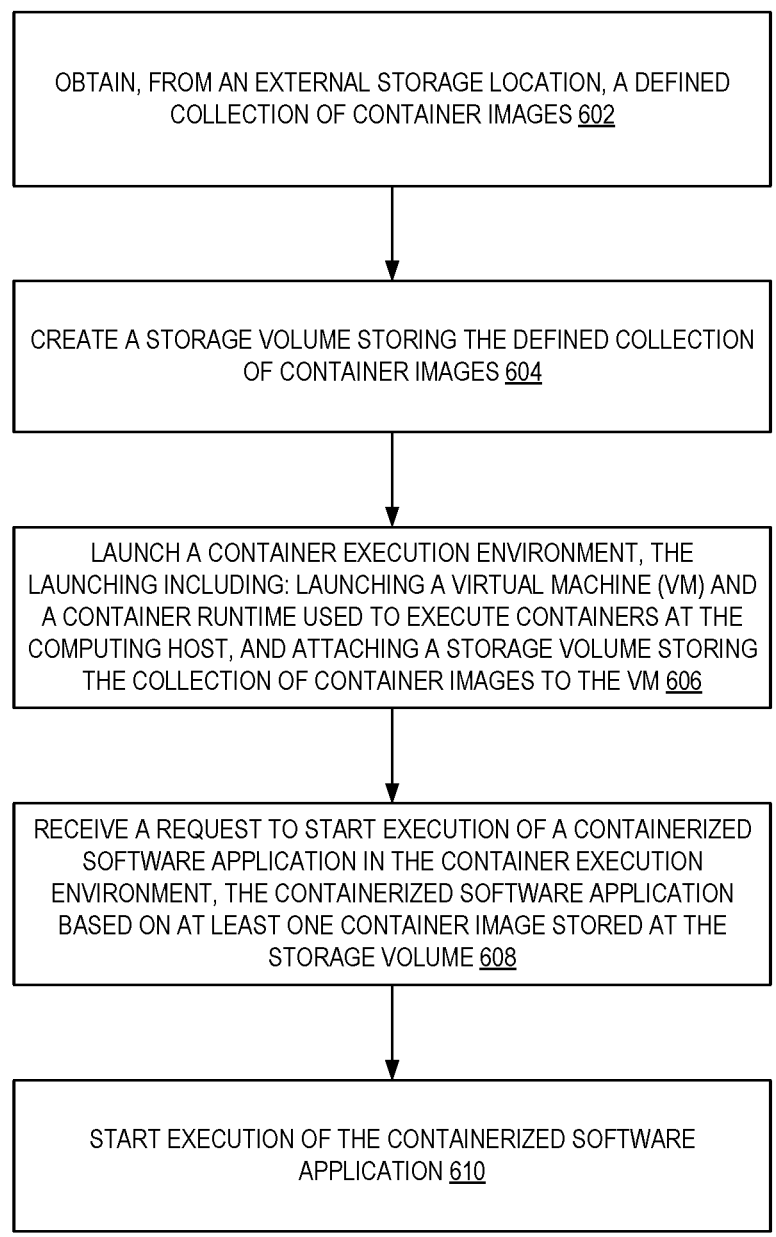
FIG. 6 is a flow diagram illustrating operations of a method for sharing prepopulated container image caches among container execution environments according to some embodiments.

FIG. 6 is a flow diagram illustrating operations 600 of a method for sharing a container image cache among container execution environments according to some embodiments. Some or all of the operations 600 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by computing devices of the other figures.

The operations 600 include, at block 602, a computing device of a service provider network obtaining, from an external storage location, a defined collection of container images. Referring to FIG. 1, for example, a computing device 116A may obtain the defined container image collection 126 from a storage location at the storage service 104 (where the storage location may be identified, for example, by a Uniform Resource Link (URL)). In an embodiment, each container image in the defined collection of container images represents a snapshot of a self-contained software application that is executable by a container runtime. In an embodiment, the defined collection of container images includes container images that are frequently used to execute containers at other container execution environments of the service provider network. In one embodiment, the defined collection of container images include user-selected container images. For example, the defined collection of container imagers can be created by a user that has selected some or all of the container images to be included in the defined collection, for example, based on container images frequently used by that user.

The operations 600 further include, at block 604, creating a storage volume storing the defined collection of container images. For example, a storage volume 128 can be created at the computing device 116A to store the defined container image collection 126 in a container image cache 130. In one embodiment, the storage volume is stored at a remote and network-accessible block storage device provided by a storage virtualization service of the service provider network. For example, the storage volume 128 may be a volume provided by a separate storage virtualization service and is accessible to the computing device 116A via a network. In one embodiment, the defined collection of container images is stored at the storage volume as read-only data. In one embodiment, the storage volume is concurrently attached by operating systems running at a plurality of separate computing devices. Referring to FIG. 4 for example, a remote and network-accessible storage volume 402 can be attached by operating systems supporting each of container execution environments 406A-406E.

The operations 600 further include, at block 606, launching a container execution environment, wherein the launching includes: launching a virtual machine (VM) and a container runtime used to execute containers at the computing device, and attaching the storage volume storing the defined collection of container images to the VM. In one embodiment, the storage volume is used by the container execution environment as a read-write storage volume using a union filesystem. Referring to FIG. 1, for example, the launching of container execution environment 118A can include launching an operating system 132 and a container runtime 134 and further attaching the storage volume 128.

The operations 600 further include, at block 608, receiving a request to start execution of a containerized software application in the container execution environment, the containerized software application based on at least one container image stored at the storage volume. For example, the request can be received from a user, from the container service, from another service or application, or from any other source.

The operations 600 further include, at block 610, starting execution of the containerized software application. In one embodiment, the container execution environment is one of a plurality of container execution environments running at the computing device, and wherein each container execution environment of the plurality of container execution environment uses the defined collection of container images stored at the storage volume. For example, container execution environment 118A may one or more any number of container execution environments 118A-118N.

In one embodiment, the computing device sends, to a data monitoring service, container image usage data reflecting a number of times container images in the defined collection of container images are used to start execution of a container in the container execution environment. Referring to FIG. 5, for example, each computing device 504A-504N may send container usage data 502 to a data monitoring service 500, which data can be used to select container images 142A-142N to include in the defined container image collection 126.

Figure 7:
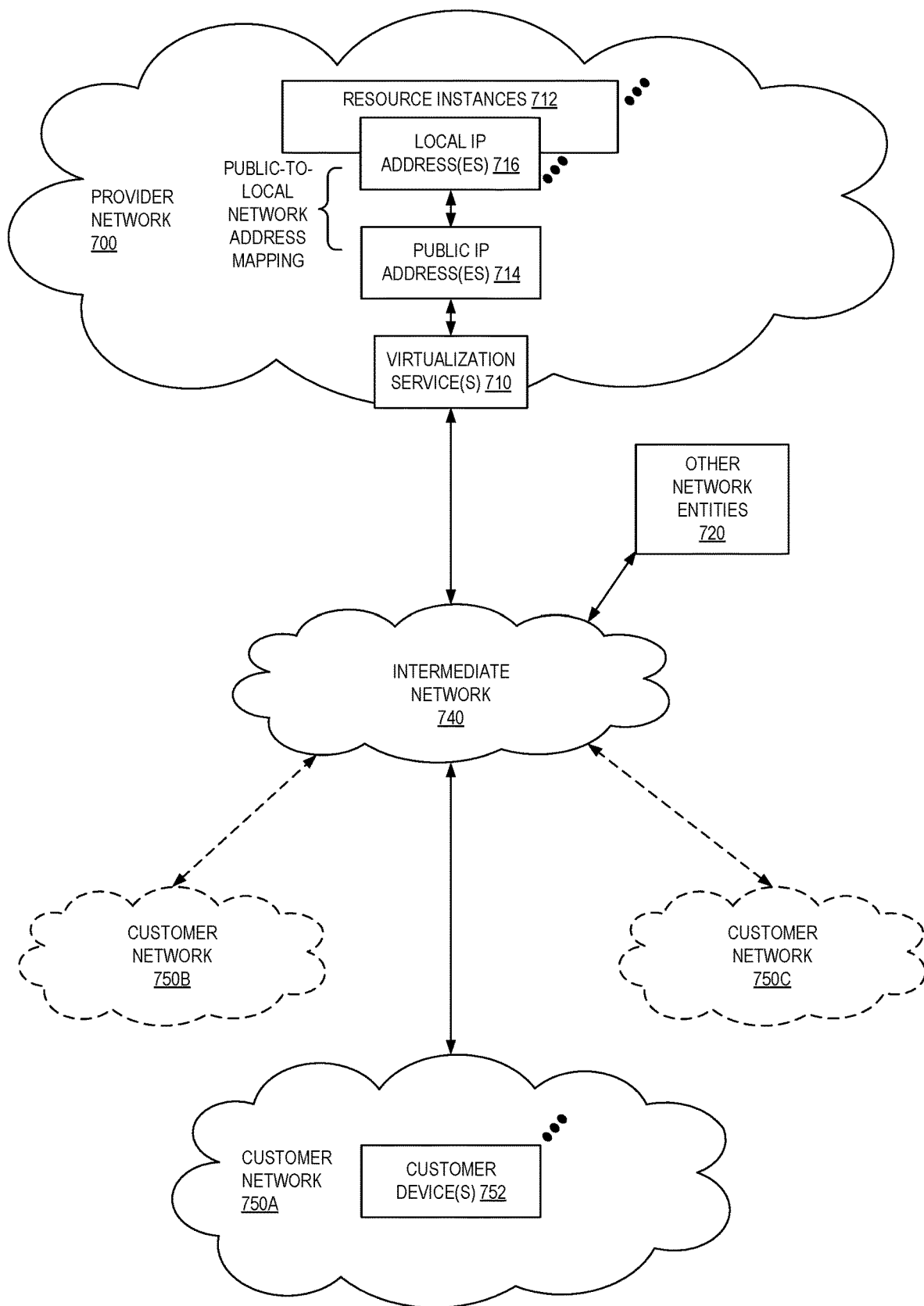
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
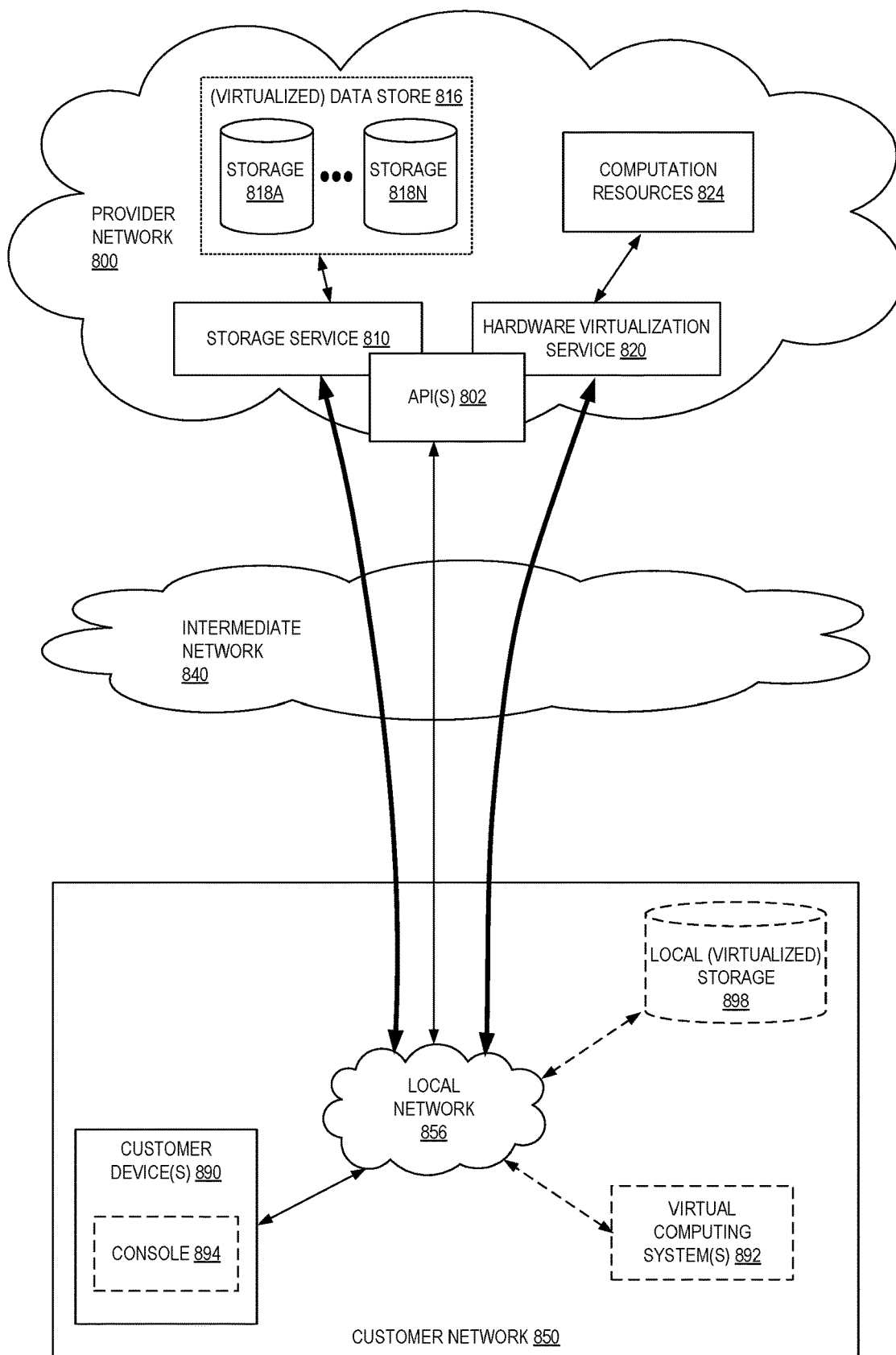
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Figure 9:
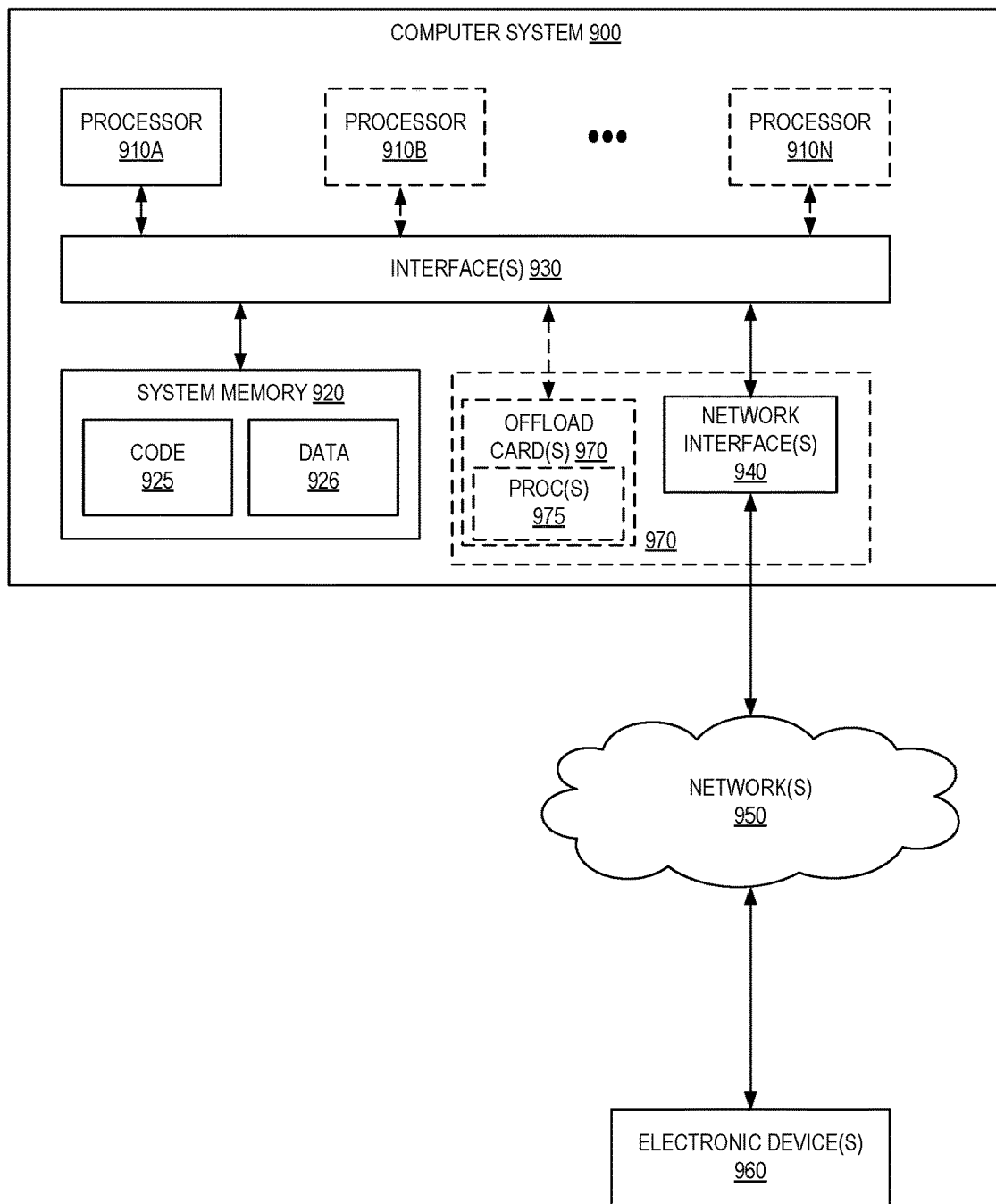
FIG. 9 is a block diagram illustrating an example computer system that may be used in some embodiments.

In some embodiments, a system that implements a portion or all of the techniques for sharing a prepopulated container image cache among container execution environments as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method performed by a computing device of a service provider network, the method comprising:
   obtaining, from an external storage location, a collection of container images, wherein each container image in the collection of container images represents a snapshot of a self-contained software application that is executable by a container runtime;
   creating a storage volume storing the collection of container images to provide a prepopulated collection of container images for use by container execution environments in a service provider network;
   launching a container execution environment, wherein the launching includes:
      launching a virtual machine (VM) and a container runtime used to execute containers at the computing device, and
      attaching, to the VM, the storage volume storing the prepopulated collection of container images, wherein the storage volume storing the prepopulated collection of container images is attached to the VM prior to the container execution environment launching any containerized software applications; and
   receiving a request to start execution of a containerized software application in the container execution environment, the containerized software application based at least in part on at least one container image stored at the storage volume; and
   starting execution of the containerized software application using the at least one container image stored at the storage volume.

2. The computer-implemented method of claim 1, wherein the prepopulated collection of container images includes container images that are frequently used to execute containers at other container execution environments of a service provider network.

3. The computer-implemented method of claim 1, wherein the storage volume is used by the container execution environment as a read-write storage volume using a union filesystem.

4. The computer-implemented method of claim 1, further comprising:
   obtaining, from an external storage location, container images used to create the prepopulated collection of container images, wherein each container image in the prepopulated collection of container images represents a snapshot of a self-contained software application that is executable by the container runtime; and
   creating the storage volume storing the prepopulated collection of container images.

5. The computer-implemented method of claim 1, wherein the storage volume is stored at a remote and network-accessible block storage device provided by a storage virtualization service of a service provider network.

6. The computer-implemented method of claim 1, wherein the storage volume is stored at a remote and network-accessible block storage device provided by a storage virtualization service, and wherein the storage volume is concurrently attached by operating systems running at a plurality of separate computing devices.

7. The computer-implemented method of claim 1, wherein the prepopulated collection of container images includes user-selected container images.

8. The computer-implemented method of claim 1, further comprising sending, to a data monitoring service, container image usage data reflecting a number of times container images in the prepopulated collection of container images are used to start execution of a container in the container execution environment.

9. The computer-implemented method of claim 1, further comprising creating the storage volume storing the prepopulated collection of container images, wherein creating the storage volume includes creating a read-only filesystem storing the prepopulated collection of container images.

10. The computer-implemented method of claim 1, wherein the container execution environment is one of a plurality of container execution environments running at the computing device, and wherein each container execution environment of the plurality of container execution environments uses the prepopulated collection of container images stored at the storage volume.

11. The computer-implemented method of claim 1, wherein the container execution environment is a first container execution environment associated with a first user of a service provider network that manages the computing device, and wherein the computing device further includes a second container execution environment associated with a second user of the service provider network, and wherein the second container execution environment uses the prepopulated collection of container images stored at the storage volume.

12. A system comprising:
a first one or more electronic devices comprising a processor to implement a storage service of a service provider network, the storage service storing a collection of container images; and
a second one or more electronic devices to implement a computing device of a container service, the computing device including instructions that upon execution cause the computing device to:
obtain, from the storage service, the collection of container images, wherein each container image in the collection of container images represents a snapshot of a self-contained software application that is executable by a container runtime;
create a storage volume storing the collection of container images to provide a prepopulated collection of container images for use by container execution environments in service provider network;
launch a container execution environment, wherein the launch includes:
launching a virtual machine (VM) and a container runtime used to execute containers at the computing device, and
attaching, to the VM, the storage volume storing the prepopulated collection of container images to the VM, wherein the storage volume storing the prepopulated collection of container images is attached to the VM prior to the container execution environment launching any containerized software applications; and
start execution of a containerized software application, the containerized software application based on at least one container image stored at the storage volume using the at least one container image stored at the storage volume.

13. The system of claim 12, wherein the prepopulated collection of container images includes container images that are frequently used to execute containers at other container execution environments of the service provider network.

14. The system of claim 12, wherein the storage volume is used by the container execution environment as a read-write storage volume using a union filesystem.

15. The system of claim 12, wherein the storage volume is stored at a remote and network-accessible block storage device provided by a storage virtualization service of a service provider network.

16. The system of claim 12, wherein the storage volume is stored at a remote and network-accessible block storage device provided by a storage virtualization service, and wherein the storage volume is concurrently attached by operating systems running at a plurality of separate computing devices.

17. The system of claim 12, wherein the container execution environment is one of a plurality of container execution environments running at the computing device, and wherein each container execution environment of the plurality of container execution environments uses the prepopulated collection of container images stored at the storage volume.

* * * * *